United States Patent
Long et al.

(10) Patent No.: US 11,517,878 B2
(45) Date of Patent: Dec. 6, 2022

(54) SELECTIVE, ADSORBATE-INDUCED SPIN STATE CHANGES IN TRANSITION METAL-BASED METAL-ORGANIC FRAMEWORKS

(71) Applicant: The Regents of the University of California, Oakland, CA (US)

(72) Inventors: Jeffrey R. Long, Oakland, CA (US); Benjamin K. Keitz, San Francisco, CA (US); Douglas Reed, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 330 days.

(21) Appl. No.: 16/089,199

(22) PCT Filed: Mar. 31, 2017

(86) PCT No.: PCT/US2017/025541
§ 371 (c)(1),
(2) Date: Sep. 27, 2018

(87) PCT Pub. No.: WO2017/173362
PCT Pub. Date: Oct. 5, 2017

(65) Prior Publication Data
US 2019/0054446 A1 Feb. 21, 2019

Related U.S. Application Data

(60) Provisional application No. 62/316,286, filed on Mar. 31, 2016.

(51) Int. Cl.
*B01J 20/22* (2006.01)
*B01D 53/02* (2006.01)
(Continued)

(52) U.S. Cl.
CPC ............ *B01J 20/226* (2013.01); *B01D 53/02* (2013.01); *B01D 53/04* (2013.01);
(Continued)

(58) Field of Classification Search
CPC .......... B01J 20/226; B01J 20/22; B01J 20/34; B01D 53/04; C01B 32/40; C01B 3/56; C07F 15/02
See application file for complete search history.

(56) References Cited

U.S. PATENT DOCUMENTS

| | | | |
|---|---|---|---|
| 2010/0204043 A1* | 8/2010 | Cho ...................... | B01D 53/02 502/401 |
| 2014/0061540 A1* | 3/2014 | Long ..................... | B01J 20/226 252/373 |

OTHER PUBLICATIONS

Demessence et al. (Strong CO2 binding in a water-stable, triazolate-bridged metal-organic framework functionalized with ethylenediamine, 2009, JACS Communications, 131, 8784-8786) (Year: 2009).*

(Continued)

*Primary Examiner* — Youngsul Jeong
(74) *Attorney, Agent, or Firm* — Venable LLP; Henry J. Daley (57) ABSTRACT

An adsorbate-selective metal organic framework includes a transition metal; and a plurality of organic molecules coordinated to the transition metal so as to preserve open coordination sites for selectively adsorbing molecules that have low-lying $\pi^*$ orbitals. The transition metal has a lowest energy spin state in the presence of the selectively adsorbed molecules that are strongly bonding to the transition metal through $\pi$-donating interactions which is different than the lowest energy spin state in the absence of these adsorbed molecules. The transition metal has also a lowest energy spin state in the presence of non-selected molecules that are weakly bonding to the transition metal through $\sigma$- and/or $\pi$-accepting and/or donating interactions.

11 Claims, 6 Drawing Sheets

Fe-BTTri (51) Int. Cl.
| | |
|---|---|
| C01B 3/56 | (2006.01) |
| B01J 20/28 | (2006.01) |
| C01B 32/40 | (2017.01) |
| B01D 53/04 | (2006.01) |
| B01J 20/34 | (2006.01) |
| C07F 15/02 | (2006.01) |

(52) U.S. Cl.
CPC ..... *B01J 20/28066* (2013.01); *B01J 20/3425* (2013.01); *B01J 20/3483* (2013.01); *B01J 20/3491* (2013.01); *C01B 3/56* (2013.01); *C01B 32/40* (2017.08); *C07F 15/025* (2013.01); *B01D 2253/204* (2013.01); *B01D 2256/10* (2013.01); *B01D 2256/16* (2013.01); *B01D 2256/22* (2013.01); *B01D 2256/24* (2013.01); *B01D 2256/245* (2013.01); *B01D 2257/102* (2013.01); *B01D 2257/104* (2013.01); *B01D 2257/502* (2013.01); *C01B 2203/042* (2013.01); *C01B 2203/047* (2013.01); *C01B 2210/002* (2013.01); *C01B 2210/0021* (2013.01)

(56) References Cited

OTHER PUBLICATIONS

Anderson et al., "A Five-Coordinate Heme Dioxygen Adduct Isolated within a Metal-Organic Framework", J. Am. Chem. Soc. (2014), vol. 136, pp. 16489-16492.
Baschuk et al., "Carbon monoxide poisoning of proton exchange membrane fuel cells", Int. J. Energy Res. (2001), vol. 25, pp. 696-713.
Bloch et al., "Reversible CO Binding Enables Tunable CO/H2 and CO/N2 Separations in Metal-Organic Frameworks with Exposed Divalent Metal Cations", J. Am. Chem. Soc. (2014), vol. 136, pp. 10752-10761.
Bloch et al., "Selective Binding of O2 over N2 in a Redox-Active Metal -Organic Framework with Open Iron(II) Coordination Sites", J. Am. Chem. Soc. (2011), vol. 133, pp. 14814-148-2.
Caskey et al., "Dramatic Tuning of Carbon Dioxide Uptake via Metal Substitution in a Coordination Polymer with Cylindrical Pores", J. Am. Chem. Soc. (2008), vol. 130, pp. 10870-10871.
Chen et al., "Metal-Organic Frameworks with Functional Pores for Recognition of Small Molecules", Acc. Chem. Res. (2010), vol. 43, pp. 1115-1124.
Chuang et al., "New Iron (II) Spin Crossover Coordination Polymers [Fe(μ-atrz)3] X22H2O (X=ClO4, BF4) and [Fe(μ-artz)(μ-pyz)(NCS)2 4H2O with an Interesting Solvent Effect" Inorg. Chem. (2012), vol. 51, pp. 4663-4671.
Colombo et al., "High thermal and chemical stability in pyrazolate-bridged metal-organic frameworks with exposed metal sites", Chem. Sci. (2011), vol. 2, pp. 1311-1319.
Czaja et al., "Industrial applications of metal-organic frameworks", Chem. Soc. Rev. (2009), vol. 38, pp. 1284-1293.
Demessence et al., "Strong CO2 Binding in a Water-Stable, Triazolate-Bridged Metal-Organic Framework Functionalized with Ethylenediamine", J. Am. Chem. Soc. (2009), vol. 131, pp. 8784-8786.
Denysenko et al., "Scorpionate-Type Coordination in MFU-4I Metal-Organic Frameworks: Small-Molecule Binding and Activation upon the Thermally Activated Formation of Open Metal Sites", Chem., Int. Ed. (2014), vol. 53, pp. 5832-5836.
Dietzel et al., "Application of metal-organic frameworks with coordinatively unsaturated metal sites in storage and separation of methane and carbon dioxide", J. Mater. Chem. (2009), vol. 19, pp. 7362-7370.
Dinca et al., "Hydrogen Storage in Microporous Metal-Organic Frameworks with Exposed Metal Sites", Angew. Chem., Int. Ed. (2008), vol. 47, pp. 6766-6779.
Dutta et al., "Developments in CO Separation" Gas. Sep. Purif. (1995), vol. 9, No. 4, pp. 277-283.
Ferey, "Hybrid porous solids: past, present, future", Chem. Soc. Rev. (2008), vol. 37, pp. 191-214.
Garcia et al., "Spin Crossover in 1D, 2D and 3D Polymeric Fe (OO) Networks", Top. Curr. Chem. (2004), vol. 233, pp. 229-257.
Gonzalez et al., "Single-Crystal-to-Single-Crystal Metalation of a Metal-Organic Framework: A Route toward Structurally Well-Defined Catalysts", Inorg. Chem. (2015), vol. 54, pp. 2995-3005.
Haase et al., Chem Eng. Prog. (1974), vol. 70, p. 74.
Halder et al., "Guest-Dependent Spin Crossover in a Nanoporous Molecular Framework Material" Science (2002), vol. 298, pp. 1762-1765.
Herm et al., "CO2/CH4, CH4/H2 and CO2/CH4/H2 separations at high pressures using Mg2(dobdc)", Microporous Mesoporous. Mater. (2012), vol. 151, pp. 481-487.
Herm et al., "Hydrocarbon Separations in Metal-Organic Frameworks", Chem. Mater. (2014), vol. 26, pp. 323-338.
Herm et al., "Metal-Organic Frameworks as Adsorbents for Hydrogen Purification and Precombustion Carbon Dioxide Capture", J. Am. Chem. Soc. (2011), vol. 133, pp. 5664-5667.
International Energy Agency. Global Action to Advance Carbon Capture and Storage: A Focus on Industrial Applications; 2013.
Kitagawa et al., "Functional Porous Coordination Polymers", Angew. Chem., Int. Ed. (2004), vol. 43, pp. 2334-2375.
Lee et al., "Design of a Metal-Organic Framework with Enhanced Back Bonding for Separation of N2 and CH4", J. Am. Chem. Soc. (2014), vol. 136, pp. 698-704.
Li et al., "Design and synthesis of an exceptionally stable and highly porous metal-organic framework", Nature (1999), vol. 402, pp. 276-279.
Li et al., "Metal-Organic Frameworks for Separations", Chem. Rev. (2012), vol. 112, pp. 869-932.
Li et al., "The CO Poisoning Effect in PEMFCs Operational at Temperatures up to 200C", J. Electrochem. Soc. (2003), vol. 150, No. 12, pp. A1599-A1605.
Liao et al., "Drastic Enhancement of Catalytic Activity via Post-oxidation of a Porous Mn Triazolate Framework", Chem. Eur. J. (2014), vol. 20, pp. 11303-11307.
Mason et al., "Evaluating metal-organic frameworks for natural gas storage", Chem. Sci. (2014), vol. 5, pp. 32-51.
Mason et al., "Evaluating metal-organic frameworks for post-combustion carbon dioxide capture via temperature swing adsorption", Energy Environ. Sci. (2011), vol. 4, pp. 3030-3040.
Matsuda et al., "Highly controlled acetylene accommodation in a metal-organic microporous material", Nature (2005), vol. 436, pp. 238-241.
McCandless, "Separation of Binary Mixtures of CO and H2 by Permeation Through Polymeric Films", Ind. Eng. Chem. Process Des. Dev. (1972), vol. 11, No. 4, pp. 470-478.
McDonald et al., "Cooperative insertion of CO2 in diamine-appended metal-organic frameworks", J. R. Nature (2015), vol. 519, pp. 303-308.
Millward et al., "Metal-Organic Frameworks with Exceptionally High Capacity for Storage of Carbon Dioxide at Room Temperature", J. Am. Chem. Soc. (2005), vol. 127, No. 51, pp. 17998-17999.
Miyajima et al., "Improved Purge Step in Pressure Swing Adsorption for CO Purification", Adsorption (2005), vol. 11, pp. 625-630.
Morris et al., "Gas Storage in Nanoporous Materials", Angew. Chem., Int. Ed. (2008), vol. 47, pp. 4966-4981.
Neville et al., "Single-Crystal to Single-Crystal Structural Transformation and Photomagnetic Properties of a Porous Iron(II) Spin-Crossover Framework", J. Am. Chem. Soc. (2008), vol. 130, pp. 2869-2876.
Niel et al., "Cooperative Spin Crossover Behavior in Cyanide-Bridged (Fe(II)-M(II) Bimetllic 3D Hofmann-like Networks (M=Ni, Pd, and Pt)", Inorg. Chem. (2001), vol. 40, pp. 3838-3839.
Ohba et al., "Bidirectional Chemo-Switching of Spin State in a Microporous Framework", Chem., Int. Ed. (2009), vol. 48, pp. 4767-4771.
Peng et al., "Methane Storage in Metal-Organic Frameworks: Current Records, Surprise Findings, and Challenges", J. Am. Chem. Soc. (2013), vol. 135, pp. 11887-11894.

(56) References Cited

OTHER PUBLICATIONS

Reed et al., "A spin transition mechanism for cooperative adsorption in metal-organic frameworks", Nature, (2017), vol. 550, pp. 96-102.
Reed et al., "REversible CO Scavenging via Adsorbate-Dependent Spin State Transitions in an Iron(II)-Triazolate Metal-Organic Framework", J. Am. Chem. Soc. (2016), vol. 138, pp. 5594-5602.
Salles et al., Multistep N2 Breathing in the Metal-Organic Framework Co(1,4-benzenedipyrazolate) Am. Chem. Soc. (2010), vol. 132, pp. 13782-13788.
Sato et al., "Self-Accelerating CO Sorption in a Soft Nanporous Crystal", Science (2014), vol. 343, pp. 167-170.
Southon et al., "Dynamic Interplay between Spin-Crossover and Host-Guest Function in a Nanoporous Metal-Organic Framework Material" J. Am. Chem. Soc. (2009), vol. 131, pp. 10998-11009.
Sumida et al., "Carbon Dioxide Capture in Metal-Organic Frameworks", Chem. Rev. (2012), vol. 112, pp. 724-781.
Tamon et al., "Adsorption of Carbon Monoxide on Activated Carbon Impregnated with Metal Halide", AIChE J. (1996), vol. 42, No. 2, p. 422.
Van Koningsbruggen, "Special Classes of Iron (II) Azole Spin Crossover Compounds", Top. Curr. Chem. (2004), vol. 233, pp. 123-149.
Zhou et al., "Introduction to Metal-Organic Frameworks" Chem. Rev. (2012), vol. 112, pp. 673-674.

\* cited by examiner

Fe-BTTri

FIG. 1a

Fe-BBTA

FIG. 1b

H₃BTTri

H₂BBTA

H₂BTDD

Fe-BTTri-DMF

FIG. 6a

Fe-BTTri-CO

FIG. 6b

Fe-BBTA

FIG. 6c

Fe-BBTA-CO

FIG. 6d

SELECTIVE, ADSORBATE-INDUCED SPIN STATE CHANGES IN TRANSITION METAL-BASED METAL-ORGANIC FRAMEWORKS

CROSS-REFERENCE TO RELATED APPLICATIONS

This application is a National Stage Application under 35 U.S.C. § 371 of PCT/US2017/025541, filed on Mar. 31, 2017, and claims priority benefit from U.S. provisional patent application No. 62/316,286, filed on Mar. 31, 2016, the entire content of which is incorporated herein by reference. All references cited anywhere in this specification, including the Background and Detailed Description sections, are incorporated herein by reference as if each had been individually incorporated.

STATEMENT OF GOVERNMENT INTEREST

This invention was made with government support under Grant Number DE-SC0001015 awarded by the Department of Energy (DOE) of the United States of America. The United States government has certain rights in the invention.

BACKGROUND

1. Field

The present application is directed to adsorbate materials and in particular to an adsorbate-selective metal organic framework and a method of separating a type of gas molecules from a mixture of types of gas molecules using the adsorbate-selective metal organic framework.

2. Background

Metal-organic frameworks (MOFs) are a class of permanently porous materials exhibiting great robustness and high internal surface areas.[1] A subset of metal-organic frameworks features high densities of open metal sites, or metal sites that preserve open coordination sites upon desolvation of the framework. These exposed or open metal sites typically act as Lewis acidic centers that can accept electron density from easily polarized gas molecules such as $CO_2$. This electrostatic interaction is the underlying basis for a wide variety of gas separation and storage processes.[2] However, many gas molecules can behave as $\pi$-acids in addition to $\sigma$-donors, and developing frameworks that take advantage of this additional property could lead to new adsorbents displaying unprecedented selectivities in separations involving carbon monoxide, unsaturated hydrocarbons, and other gases with low-lying $\pi^*$ orbitals. In order to strongly bind these types of molecules, frameworks need to possess exposed transition metal centers that function not as just exposed partial positive charges, but as sites capable of $\pi$ back-donation.[3] Unfortunately, this feature has been difficult to realize in practice, as the majority of frameworks with open metal sites are ligated by weak-field carboxylate or aryl-oxide ligands, resulting in electron-poor, high-spin metal centers that are only weakly $\pi$-donating. As a result, only a small number of metal-organic frameworks feature exposed electron-rich, low-spin first row transition metals suitable for $\pi$ back-donation.[4]

Therefore, there remains a need for improved metal organic frameworks that provide adsorption of selective types of molecules.

SUMMARY OF THE DISCLOSURE

An aspect of the present disclosure is to provide an adsorbate-selective metal organic framework. The adsorbate-selective metal organic framework includes a transition metal; and a plurality of organic molecules coordinated to the transition metal so as to preserve open coordination sites for selectively adsorbing molecules that have low-lying $\pi^*$ orbitals. The transition metal has a lowest energy spin state in the presence of the selectively adsorbed molecules that are strongly bonding to the transition metal through $\pi$-donating interactions which is different than the lowest energy spin state in the absence of these adsorbed molecules. The transition between these two different spin states is reversible upon a variety of physical changes, for example the introduction of gas or application of vacuum, among other things, that add or remove the adsorbed species. The transition metal has also a lowest energy spin state in the presence of non-selected molecules that are weakly bonding to the transition metal through $\sigma$- and/or $\pi$-accepting and/or donating interactions.

Another aspect of the present disclosure is to provide a method of separating a selected type of gas molecules from a mixture of types of gas molecules. The method includes exposing a porous material to the mixture of types of gas molecules; and separating the selected type of gas molecules from the mixture of types of gas molecules after being exposed to the porous material. The selected type of gas molecules that are separated from the mixture of types of gas molecules are adsorbed preferentially by the porous material during the exposing compared to adsorption of other types of gas molecules in the mixture of types of gas molecules.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention.

One application of frameworks containing π-donating exposed metal sites is in the area of carbon monoxide separations. New adsorbent-based technologies can be envisioned for both CO removal as well as CO purification. For example, trace CO removal from H$_2$ is relevant to both ammonia production and fuel cell technologies, as even ppm levels (often<10 ppm) of CO can poison the catalysts used in these processes.[5] However, the broad concepts of the current invention are not limited to only these examples. Aside from CO scrubbing or removal, CO is a convenient chemical precursor used in the production of several commodity chemicals, including monomers and polymers, alcohols, and acetic acid.[6]

Carbon monoxide is a major byproduct of the global production of iron and steel, and currently this vast resource is just wasted and burned to make CO$_2$, contributing over 2.5 billion tons of CO$_2$ each year.[7] Carbon monoxide purification from these byproduct gas streams, as well as from other streams like syngas production or coal gasification, would require efficient separations from other gases, such as H$_2$, N$_2$, CO$_2$, and hydrocarbons. Additionally, CO is produced in several combustion, partial oxidation, and oxidative coupling processes that may produce CO$_2$, methane, ethylene, and other hydrocarbons, requiring these separations as well.[8] Lastly, adjustment of CO concentration in syngas for use in CO/H$_2$ mixtures of various ratios could also be done with a readily regenerable CO adsorbant.[6] Currently, CO separations are achieved via cryogenic distillation, although membrane,[9] adsorption,[10] and liquid-based adsorption[11] processes have also been investigated. While some metal-organic frameworks have been studied for CO adsorption,[12] most frameworks either do not bind CO strongly enough to remove trace amounts or show the desired selectivity for CO over other gas molecules, or have working capacities and regeneration energies that can be greatly improved, limiting their use in practical applications.[13]

In order to achieve highly selective CO binding while retaining good reversibility, we envisioned a material in which the exposed metal center could interconvert between high-spin and low-spin configurations. A low-spin metal center would afford an elusive electron donating metal species capable of strong CO interactions for trace CO removal and selective CO adsorption over easily polarized gas molecules, while the ability to convert back to high-spin would also allow for facile desorption of CO due to the much weaker metal-carbonyl interaction. To date, only a small number of metal-organic frameworks display the ability to undergo reversible spin transitions and retain their porosity,[14] and none feature accessible, coordinatively unsaturated metal sites. We hypothesized that a framework with exposed Fe$^{2+}$ in a triazolate-based coordination environment would be a promising material, due to the large number of spin-crossover Fe$^{2+}$-triazolate complexes and materials.[15] Specifically, iron analogues of two different triazolate-based frameworks were targeted due to their high concentration of open metal sites. One is a copper framework previously synthesized in our group, Cu-BTTri (H[(Cu$_4$Cl)$_3$(BTTri)$_8$], H$_3$BTTri=1,3,5-tris(1H-1,2,3-triazol-5-yl)benzene)), and the second is the manganese framework Mn-BBTA, (Mn$_2$Cl$_2$BBTA, H$_2$BBTA=1H,5H-benzo(1,2-d:4,5-d')bistriazole).[16,17] Herein, we report the new materials Fe-BTTri ([Fe(MeOH)$_6$]$_3$[(Fe$_4$Cl)$_3$(BTTri)$_8$]$_2$), Fe-BBTA (Fe$_2$Cl$_2$BBTA), and an expanded version of Fe-BBTA, Fe-BTDD (Fe$_2$Cl$_2$BTDD, H$_2$BTDD=bis(1H-1,2,3-triazolo[4,5-b],-[4',5'-i])dibenzo[1,4]dioxin), which all feature coordinatively unsaturated Fe$^{2+}$ sites that reversibly convert from high-spin Fe$^{2+}$ in the bare framework to low-spin Fe$^{2+}$ in the presence of carbon monoxide.

The applications of these materials and this adsorbate-induced spin transition are numerous. Fe-BTTri shows a tremendous capacity for CO at very low concentrations, adsorbing 1.45 mmol/g at just 100 μbar at room temperature, making it suitable for removal of trace CO. Due to this strong binding, Fe-BTTri displays some of the highest selectivity values (>20000 IAST selectivity for 1% CO in $CO/H_2$ mixtures at 25° C. and 1 bar total pressure) ever observed for metal-organic frameworks for preferential CO adsorption. In a different manner, Fe-BBTA and Fe-BTDD show 'stepped' (Type V) CO adsorption isotherms at room temperature, likely due to the interaction of different iron centers along the Fe—Cl chains of the material. This type of stepped isotherm is unprecedented for room temperature CO adsorption, and isotherms of this type have been shown to be very effective adsorbants with low regeneration energies and high working capacities,[18] ideal for separation of CO from $H_2$ at higher pressures.

Synthesis of Fe-BTTri, Fe-BBTA, and Fe-BTDD. Fe-BTTri, Fe-BBTA, and Fe-BTDD were all synthesized from $FeCl_2$ and the appropriate ligand in dimethylformamide (DMF) and methanol (MeOH) to produce the solvated frameworks as microcrystalline powders. The solvated frameworks can be desolvated by soaking in MeOH to remove DMF, followed by heating under dynamic vacuum to yield the activated frameworks. The powders retain crystallinity through activation, as assessed by powder X-ray diffraction data. $N_2$ adsorption at 77 K for Fe-BTTri gives a Langmuir surface area of 1930 $m^2/g$ and a Brunauer-Emmett-Teller (BET) surface area of 1630 $m^2/g$, and for Fe-BBTA a $SA_{Lang}$ of 1500 $m^2/g$ is observed, in good agreement with Cu-BTTri and Mn-BBTA. Fe-BBTD displays larger surfaces area, with a $SA_{Lang}$ of 3170 $m^2/g$, consistent with its larger pore size. The structures of Fe-BTTri and Fe-BBTA, shown in FIGS. 1a and 1b, respectively, can be determined from data from single crystal and powder X-ray diffraction. The structure of Fe-BTDD, while not solved, is expected to be similar to that of Fe-BBTA (shown in FIG. 1b).

Figure 1A:
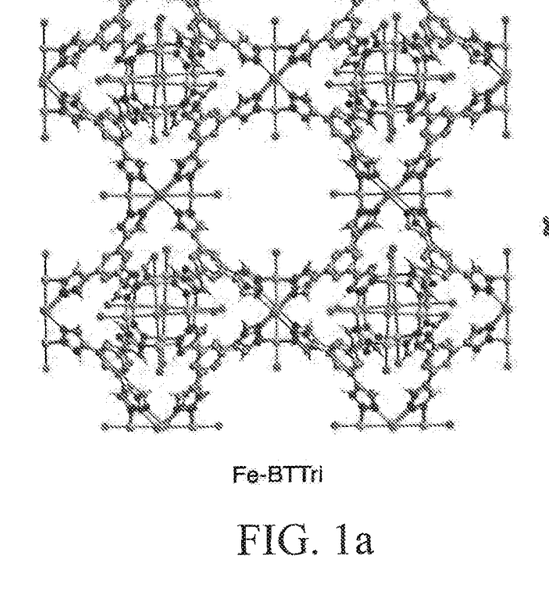
FIG. 1a shows upper portions of the structures of DMF-solvated Fe-BTTri, according to an embodiment of the present disclosure.
Figure 1B:
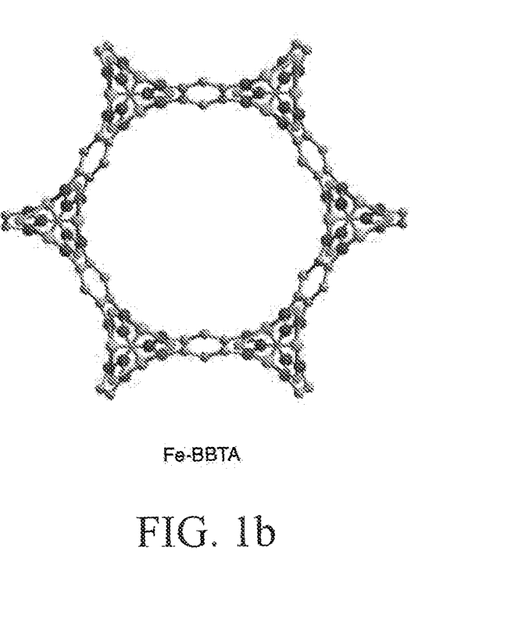
FIG. 1b shows upper portions of the structures of Fe-BBTA, according to an embodiment of the present disclosure.
Figure 1C:
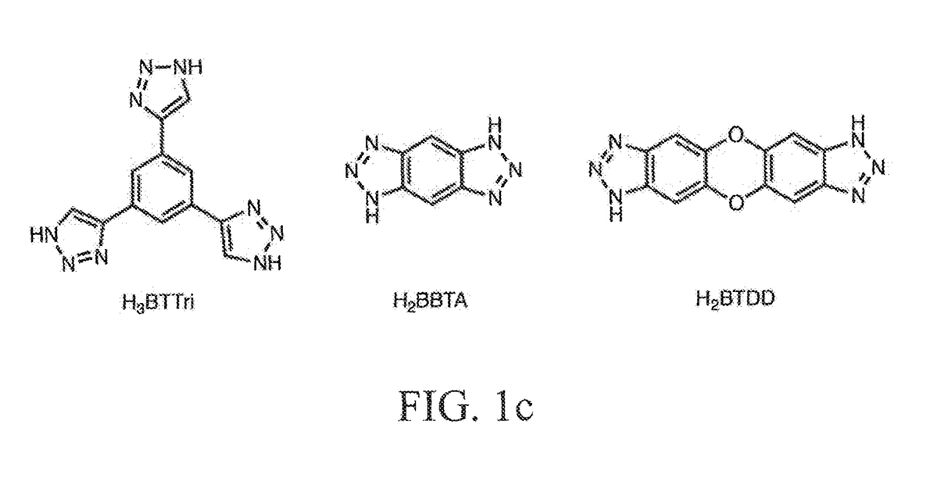
FIG. 1c shows the lower chemical structures $H_3BTTri$, $H_2BBTA$ and $H_2BTDD$ which represent the structures of ligands, according to an embodiment of the present disclosure.

FIG. 1a shows upper portions of the structures of DMF-solvated Fe-BTTri, according to an embodiment of the present disclosure. FIG. 1b shows upper portions of the structures of Fe-BBTA, according to an embodiment of the present disclosure. In an embodiment, the structures shown in FIGS. 1a and 1b are determined from analysis of single crystal or powder X-ray diffraction data. Certain H atoms and C and N atoms on iron bound DMF atoms in Fe-BTTri are omitted for clarity. Orange, grey, blue, red, green, and white spheres represent Fe, C, N, O, Cl, and H atoms, respectively. FIG. 1c shows the lower chemical structures $H_3BTTri$, $H_2BBTA$ and $H_2BTDD$ which represent the structures of ligands.

Figure 2A:
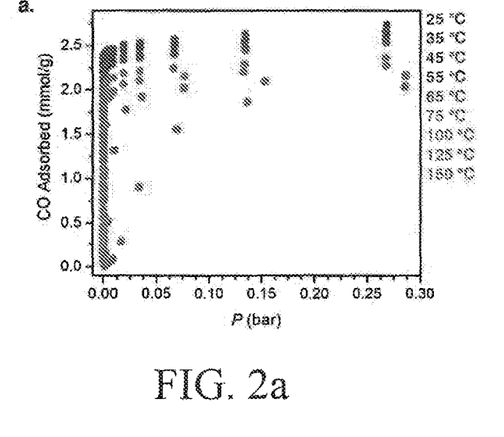
FIG. 2a is a plot showing excess CO isotherms in Fe-BTTri measured at various temperatures (from 25 deg. ° C. to 150° C.), according to an embodiment of the present disclosure.
Figure 2B:
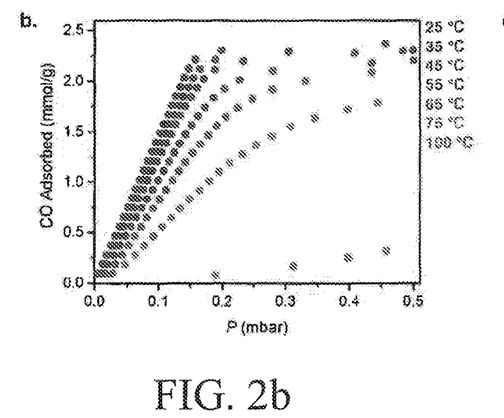
FIG. 2b is a plot showing details of low pressure region (i.e., zooming to the lower pressure region), according to an embodiment of the present disclosure.
Figure 2C:
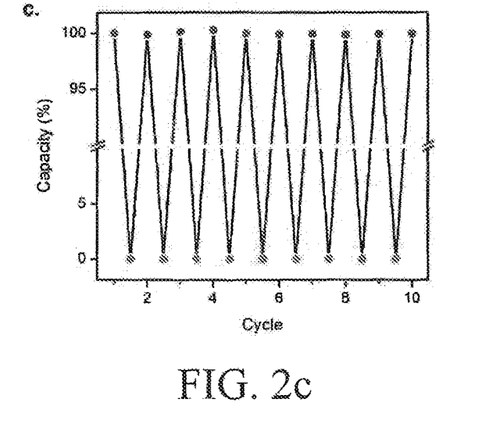
FIG. 2c is a plot showing cycling data of successive adsorption and desorption of carbon monoxide (CO) in Fe-BTTri, with adsorption expressed in terms of percentage of the capacity during cycle 1, according to an embodiment of the present disclosure.
Figure 2D:
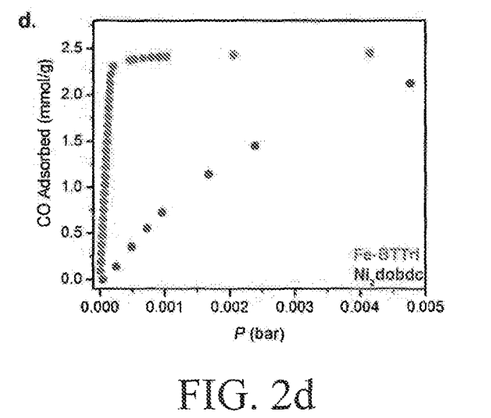
FIG. 2d is a plot showing excess CO isotherms collected at a temperature of 25° C. for Fe-BTTri (red) and Ni$_2$(dobdc) (brown), according to an embodiment of the present disclosure.

Gas adsorption of Fe-BTTri. Fe-BTTri was investigated for various gas adsorption properties. Gas adsorption isotherms for CO were conducted at various temperatures (from 25 deg. ° C. to 150° C.) and the results plotted. FIG. 2a is a plot showing excess CO isotherms in Fe-BTTri measured at various temperatures (from 25 deg. ° C. to 150° C.), according to an embodiment of the present disclosure. The vertical axis represents an amount of CO adsorbed (in mmol/g) and the horizontal axis represents the pressure (in bar). FIG. 2b is a plot showing details of low pressure region (i.e., zooming to the lower pressure region), according to an embodiment of the present disclosure. FIG. 2c is a plot showing cycling data of successive adsorption and desorption of carbon monoxide (CO) in Fe-BTTri, with adsorption expressed in terms of percentage of the capacity during cycle 1, according to an embodiment of the present disclosure. Adsorption (blue circles) occurred within 10 minutes upon dosing CO at 25° C. at 10 mbar, and desorption (red circle) occurred by placing the heating the sample at 150° C. under dynamic vacuum for 5 minutes. FIG. 2d is a plot showing excess CO isotherms collected at a temperature of 25° C. for Fe-BTTri (red) and $Ni_2(dobdc)$ (brown), according to an embodiment of the present disclosure.

As shown in FIG. 2a and FIG. 2b, the CO adsorption isotherm at 25° C. shows an extremely steep initial rise, reaching a value of 1.49 mmol/g adsorbed at just 102 µbar. The sharp initial uptake ends at 2.2 mmol/g at 157 µbar, and subsequent uptake more gradually increases to 2.7 mmol/g at 0.268 bar, corresponding to 75% of all available iron sites. This sharp uptake is also seen at higher temperatures, with significant uptake of CO still observable at 100° C., reaching 1.08 mmol/g at 1.06 mbar. The high isosteric heat of CO adsorption (−65 kJ/mol), combined with steep uptake of CO at low pressures and high capacities, suggests Fe-BTTri is a promising candidate for extracting and removing very low concentrations of CO. Indeed, as shown in FIG. 2d, the CO adsorption capacity at 0.05 mbar for Fe-BTTri, unprecedented for these materials, is two orders of magnitude higher than the previous best material, $Ni_2(dobdc)$ ($dobdc^{4-}$=2,5-dioxido-1,4-benzene-dicarboxylate).

Even with the strong binding of CO, ready desorption of the adsorbed CO can be accomplished by heating CO-dosed Fe-BTTri under dynamic vacuum at 150° C. for as little as 5 minutes. As shown in FIG. 2c, substantially no loss in CO capacity is observed even after 10 cycles. At lower temperatures, full reactivation can be achieved by using slightly longer activation times (e.g., 30 min at 100° C.). As Fe-BTTri shows significant adsorption at temperatures as high as 75° C., this small temperature swing for full regeneration is ideal for industrial purposes.

Figure 3A:
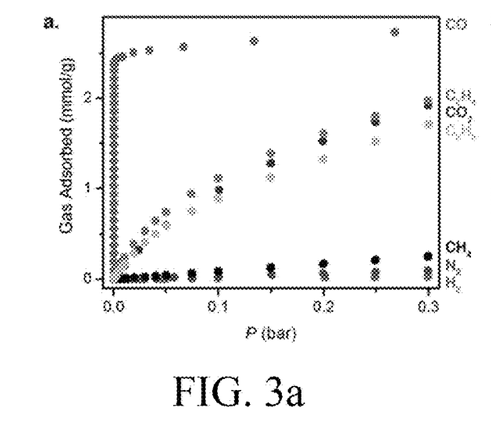
FIG. 3a is plot showing gas adsorption isotherms at 25° C. in Fe-BTTri, according to an embodiment of the present disclosure.
Figure 3B:
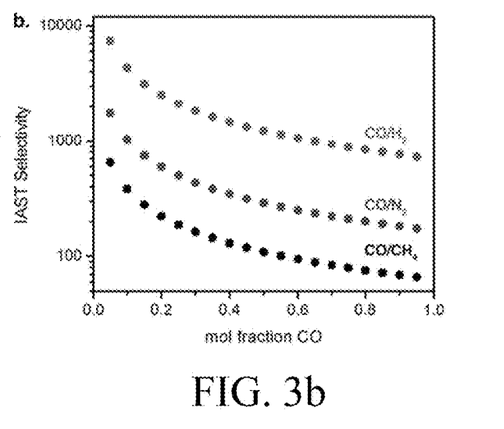
FIG. 3b is a plot showing calculated IAST selectivities for Fe-BTTri for CO in mixtures with H$_2$, N$_2$, and CH$_4$ at 1 bar total pressure at 25° C., according to an embodiment of the present disclosure.
Figure 3C:
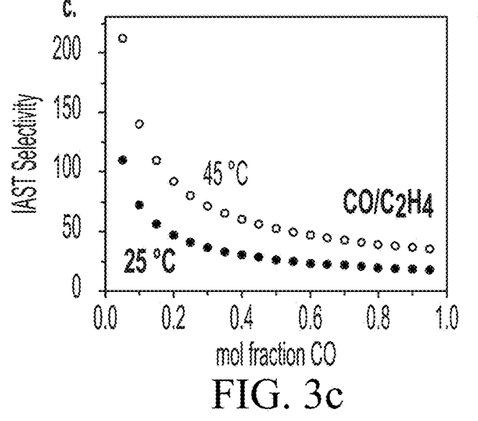
FIGS. 3c, 3d and 3e are plots showing calculated IAST selectivities for Fe-BTTri for CO in mixtures with C$_2$H$_4$ (FIG. 3c), CO$_2$ (FIG. 3d), and C$_2$H$_6$ (FIG. 3e) at 1 bar total pressure at 25 or 45° C., according to an embodiment of the present disclosure.
Figure 3D:
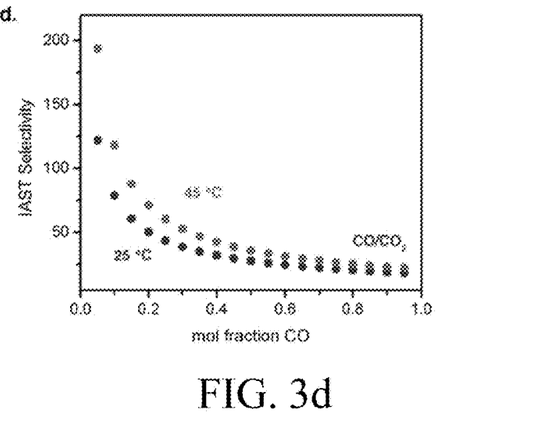
Figure 3E:
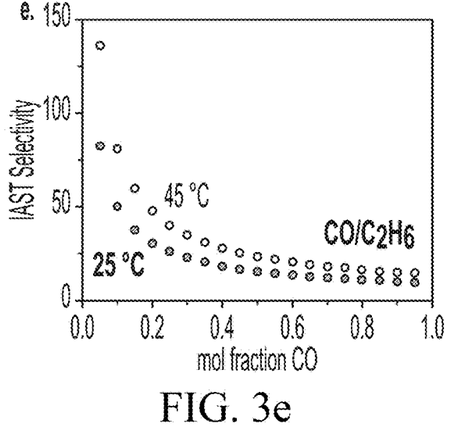
Figure 3F:
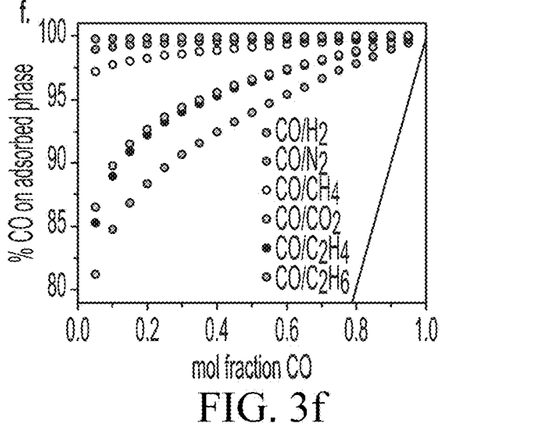
FIG. 3f is a plot showing calculated purities of the adsorbed phase in Fe-BTTri for CO in mixtures with various gases at 25° C. and 1 bar total pressure, with the black line representing non-selective adsorption, according to an embodiment of the present disclosure.

FIG. 3a is plot showing gas adsorption isotherms at 25° C. in Fe-BTTri, according to an embodiment of the present disclosure. FIG. 3b is a plot showing calculated IAST selectivities for Fe-BTTri for CO in mixtures with $H_2$, $N_2$, and $CH_4$ at 1 bar total pressure at 25° C., according to an embodiment of the present disclosure. FIGS. 3c, 3d and 3e are plots showing calculated IAST selectivities for Fe-BTTri for CO in mixtures with $C_2H_4$ (FIG. 3c), $CO_2$ (FIG. 3d), and $C_2H_6$ (FIG. 3e) at 1 bar total pressure at 25 or 45° C., according to an embodiment of the present disclosure. FIG. 3f is a plot showing calculated purities of the adsorbed phase in Fe-BTTri for CO in mixtures with various gases at 25° C. and 1 bar total pressure, with the black line representing non-selective adsorption, according to an embodiment of the present disclosure.

To assess the ability of Fe-BTTri to separate CO from mixed gas streams, pure component $H_2$ adsorption isotherms were also collected. For the 25° C. isotherm, at all pressures only a small uptake of $H_2$ is observed, rising gradually to 0.06 mmol/g at 1.0 bar (FIG. 3a). At all pressures measured, Fe-BTTri adsorbs significantly more CO than $H_2$, suggesting selective adsorption of CO. In order to evaluate the separation capabilities, selectivity factors using Ideal Adsorbed Solution Theory (IAST) were calculated for a hypothetical mixed gas stream containing a variety of different gas compositions at 1 bar total pressure. For all calculated $CO/H_2$ mixtures, Fe-BTTri shows very high IAST selectivity values. At low concentrations of CO in a mixture with $H_2$ (5% CO at a total pressure of 1.0 bar), IAST predicts a selectivity of 7400 for CO over $H_2$, over 40% higher than the values calculated for $Ni_2$ (dobdc), and among the best values for any mixed gas separation with a metal-organic framework (FIG. 3b). Typically, CO concentrations in $H_2$ streams are 1%-3%, and at these concentrations for 1.0 bar total pressure, IAST predicts even higher selectivity, 10900 at 3% CO and 24800 at 1% CO. In addition, the strong upward trend towards lower concentrations of CO suggests Fe-BTTri is a very promising CO scrubbing material. For example, for fuel cell technologies and other applications sensitive to even ppm levels of CO, one can envision performing these separations at higher pressures or different temperatures to achieve nearly complete CO removal.

The purity of the adsorbed phase in these separations was also examined, as the adsorbed CO can also be used as a starting material in several industrial processes. These IAST values for CO/$H_2$ mixtures correspond to extremely pure CO, spanning from 99.6% pure CO at the very lowest concentration of CO (1% CO in a CO/$H_2$ mixture at 1 bar total pressure), to 99.99% at higher CO concentrations. In examining the ability of Fe-BTTri to separate CO from other gas streams, such as $N_2$, $CO_2$, $CH_4$, $C_2H_6$, and $C_2H_4$, single component isotherms were conducted. The data is collected and plotted in FIG. 3a. For $CH_4$ and $N_2$, the 25° C. isotherms rise gradually to 0.69 and 0.26 mmol/g at 1.0 bar, respectively, and for all pressures measured Fe-BTTri adsorbs significantly more CO, leading to high calculated IAST selectivities. As shown in FIG. 3b, for $N_2$, these IAST values are as high as 1750 (for a 0.05 mol fraction of CO in a 1 bar total CO/$N_2$ mixture at 25° C.), corresponding to 98.9% pure CO in the adsorbed phase, are observed at room temperature. As it can be understood, this is much more practical than the near cryogenic temperatures (120 K) required for other frameworks that exhibit this selectivity. This selectivity value is also over 200% higher than that of $Ni_2$(dobdc), which shows this separation ability at room temperature. IAST values are similarly high for $CH_4$, with values approaching as high as 650 (for a 0.05 mol fraction of CO in a 1 bar total CO/$CH_4$ mixture at 25° C.), corresponding to 97.1% adsorbed CO. Both CO/$N_2$ and CO/$CH_4$ selectivities in Fe-BTTri approach 99.9% CO on the adsorbed phase at higher concentrations of CO in hypothetical CO/$N_2$ and CO/$CH_4$ mixtures, indicating the usefulness of the Fe-BTTri material to collect pure CO from gas streams.

As shown in FIG. 3a, for $CO_2$, $C_2H_6$, and $C_2H_4$, the 25° C. isotherms rise gradually to 3.52, 3.83, and 3.64 mmol/g at 1.0 bar, respectively. While the uptake is significant, the low pressure (<300 mbar) uptake is much more gradual than that of CO adsorption, suggesting that potential selectivities can be achieved. Indeed, for Fe-BTTri, IAST selectivites of 121 (for a 0.05 mol fraction of CO in a 1 bar total CO/$CO_2$ mixture at 25° C.) are calculated for CO over $CO_2$ (see, FIG. 3d). In addition, because of the strong binding of CO relative to $CO_2$, increasing the temperature from 25° C. to 45° C. increases the IAST selectivities significantly, going from 121 to 193 for a 5:95 CO:$CO_2$ mixture at 1.0 bar total pressure. This temperature dependence of IAST selectivity is also observed in CO/$C_2H_4$ and CO/$C_2H_6$ mixtures, with IAST values similar to that of CO/$CO_2$ separations (see, FIG. 3c and FIG. 3e). As it can be understood, these values still translate to highly pure CO in the adsorbed phase, as 50% CO in mixtures of CO/$CO_2$, CO/$C_2H_4$, and CO/$C_2H_6$ at 25° C. correlate to 93.2-96.5% CO in the adsorbed phase (see, FIG. 3f). Therefore, overall, Fe-BTTri shows the ability to separate CO from a variety of different gas mixtures at very low pressures and adsorbs substantially pure CO (greater than 90% CO) in the adsorbed phase for further use.

Figure 4A:
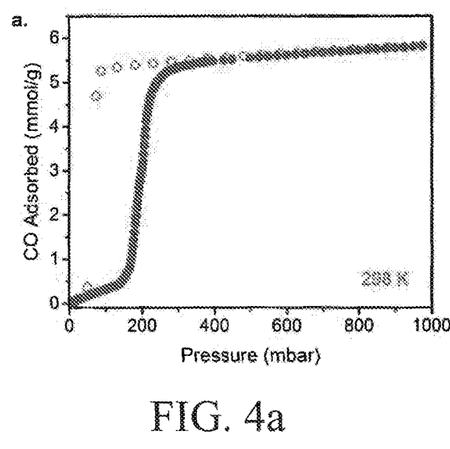
FIG. 4a is a plot showing an excess CO isotherm collected at 25° C., according to an embodiment of the present disclosure.
Figure 4B:
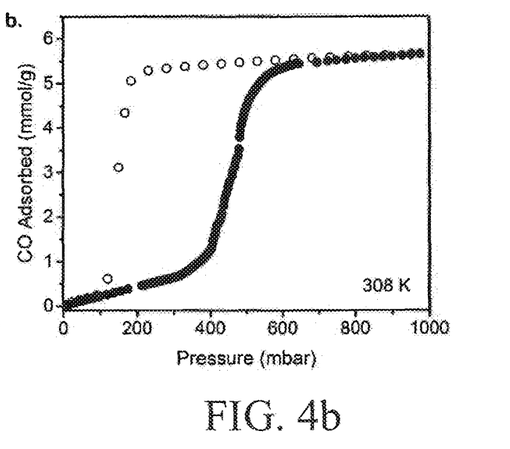
FIG. 4b is a plot showing an excess CO isotherm collected at 35° C., according to an embodiment of the present disclosure.
Figure 4C:
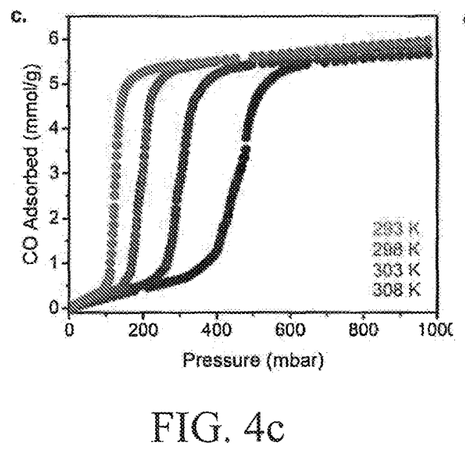
FIG. 4c is a plot showing excess CO isotherms collected at various temperatures, according to an embodiment of the present disclosure.
Figure 4D:
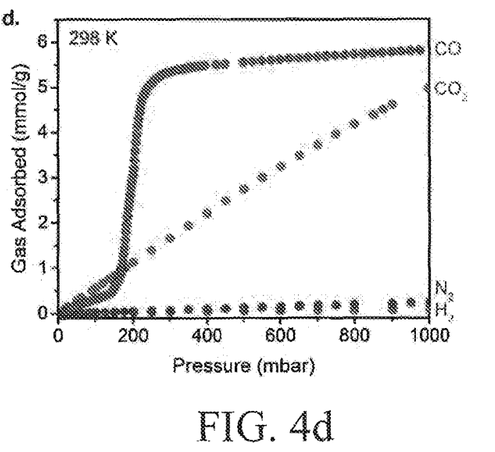
FIG. 4d is a plot showing excess CO, CO$_2$, N$_2$, and H$_2$ isotherms collected at 25° C., according to an embodiment of the present disclosure.

Gas Adsorption in Fe-BBTA and Fe-BTDD. Gas adsorption isotherms for CO were conducted at various temperatures for Fe-BBTA. Gas isotherms collected for Fe-BBTA, with filled circles represent adsorption points and open circles represent desorption points. FIG. 4a is a plot showing an excess CO isotherm collected at 25° C., according to an embodiment of the present disclosure. FIG. 4b is a plot showing an excess CO isotherm collected at 35° C., according to an embodiment of the present disclosure. FIG. 4c is a plot showing excess CO isotherms collected at various temperatures, according to an embodiment of the present disclosure. FIG. 4d is a plot showing excess CO, $CO_2$, $N_2$, and $H_2$ isotherms collected at 25° C., according to an embodiment of the present disclosure.

Immediately apparent in FIGS. 4a-4d is the Type V, 'stepped' shape of the isotherm. For the 25° C. isotherm, the isotherm starts with only a gradual rise, reaching 0.4 mmol/g at 150 mbar. However, the isotherm immediately becomes significantly steeper, rising to 5.2 mmol/g at just under 200 mbar. The isotherm then levels off and gradually increases to 5.7 mmol/g, corresponding to approximately 98% of open iron sites, or an extremely high 13.7 wt % of CO. This total capacity is one of the highest room temperature CO capacities observed in metal-organic frameworks. Desorption of the CO shows some hysteresis, but all adsorbed CO is removed by 70 mbar at 25° C.

The step position of these isotherms is highly temperature dependent, and moves dramatically with even a small temperature shift. By increasing the temperature to just 35° C., the step position moves to 400 mbar for adsorption, while the material releases almost all bound CO by 110 mbar. This suggests that with just a small temperature swing, adsorption at 20° C. and desorption at 35° C., both at 100 mbar, could recover 5.1 mmol/g, or 12.5 wt % CO. This extremely high working capacity is unique to these stepped shape isotherms. Currently, regeneration energies of the materials are being measured, as these materials often show low regeneration energies due to their high working capacities, ideal for replacing current cryogenic technology for CO purification from syngas and for separation of CO from steel manufacturing waste streams, for the latter of which there is no current solution. The material is recyclable and shows no loss in capacity after several cycles, indicating its utility for these processes.

Due to the phase change upon adsorption of CO, as shown by the stepped isotherm, IAST selectivities cannot be calculated. However, FIG. 4d shows the comparison of CO, $CO_2$, $H_2$, and $N_2$ isotherms collected at 25° C., and compared to $H_2$ and $N_2$, the amount of CO adsorbed is significantly higher at all pressures measured. The $H_2$ and $N_2$ isotherms only rise to 0.08 and 0.24 mmol/g, respectively, at 1.0 bar, significantly lower than that of Fe-BBTA, suggesting the great potential for very selective CO adsorption over these molecules. Furthermore, the $CO_2$ isotherm is very linear, and rises steadily to 4.96 mmol/g at 1.0 bar. Calculations of molar selectivity (S) values from the pure component isotherms results in values of 232 and 124 for a 1:3 or 1:1 CO:$H_2$ ratio, respectively, at 25° C. and 1.0 bar total pressure, with similarly high selectivities obtained for CO/$N_2$ mixtures. These high selectivity values demonstrate the utility of 1 for potential separations involving CO. Although the pre-step region of CO isotherm shows a lower uptake of CO than $CO_2$, after the step Fe-BBTA shows significantly higher CO uptake compared to $CO_2$, again implying a very good selectivity for CO even in the presence of a very highly polarizable gas such as $CO_2$ At every point after the step, 1 adsorbed more CO than $CO_2$, and demonstrated a stronger binding enthalpy ($Q_{st}$) of −66 kJ/mol compared to −23 kJ/mol for $CO_2$, suggesting the potential for selective CO adsorption even in the presence of strongly binding species. This suggests that high purity CO can be adsorbed, and ongoing efforts into obtaining accurate analysis of the purity of the adsorbed phase are being pursued.

Figure 5:
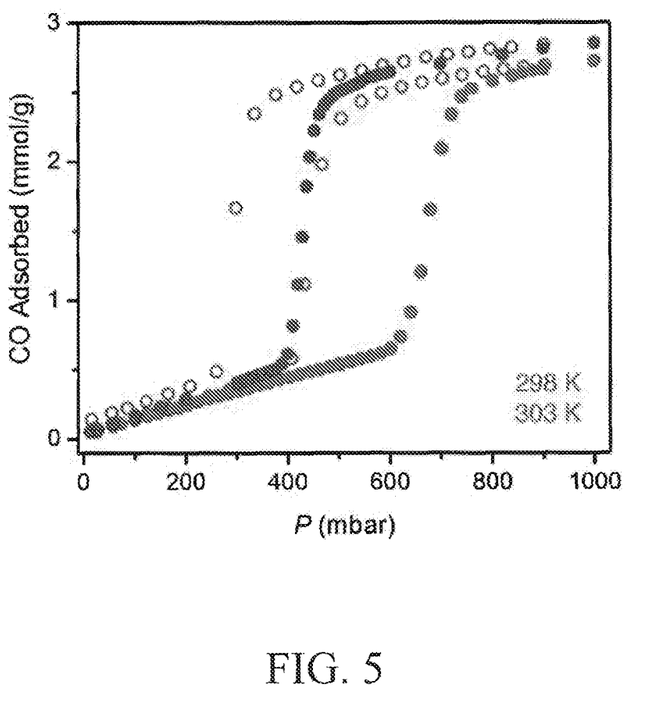
FIG. 5 is a plot showing CO isotherms collected at various temperatures in Fe-BTDD, showing both adsorption (filled circles) and desorption (open circles), according to an embodiment of the present disclosure.

FIG. 5 is a plot showing CO isotherms collected at various temperatures in Fe-BTDD, showing both adsorption (filled circles) and desorption (open circles), according to an embodiment of the present disclosure. As shown in FIG. 5, Fe-BTDD displays similar CO adsorption characteristics to Fe-BBTA. Single component CO isotherms show a stepped shape isotherm. Interestingly, the step starts at a much higher position, 400 mbar for the 25° C. isotherm, for reasons that are still being explored. The Fe-BBTA material shows the same temperature dependence on the CO adsorption, and would again be extremely useful for CO purification from gas mixtures. In this case, the step for adsorption at 25° C. occurs at a lower pressure than the desorption step at 30° C., indicating an extremely small temperature swing for removing the CO on the material. As it can be appreciated, this demonstrates that a small change to the ligand shows a drastic change in the adsorption behavior of the material, allowing for control of step position by changing the ligand. For this reason, modifications of the aryl ring of the ligands can be made to alter the step pressure, and this step pressure can be tuned to be optimal for a variety of different conditions depending on the partial pressure of CO and temperature of a gas stream to be effective for CO separations.

Spin State Characterization. In order to probe the spin state of these materials, a variety of spectroscopic methods were employed, including infrared and Mössbauer spectroscopy, DC (direct current) magnetic susceptibility, and structural characterization. For Fe-BTTri, dosing of the material with CO shows the appearance of a sharp absorbance peak at 2017 $cm^{-1}$ in the infrared spectra. This is red-shifted relative to gas phase CO (2143 $cm^{-1}$), indicating π back-donation to the CO center from the iron site. While exciting in that it shows direct evidence of electron donation from an open metal site of a metal-organic framework to a substrate that is also readily released, it also indicates that the $Fe^{2+}$ site is low-spin, as high-spin $Fe^{2+}$—CO interactions display blue-shifted CO stretching frequencies.

Figure 6A:
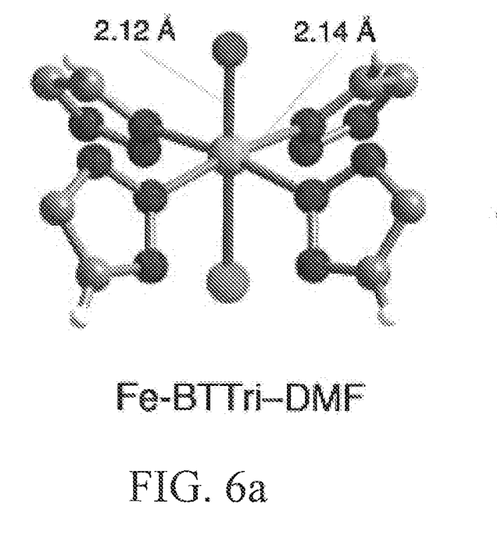
FIG. 6a depicts portions of the structures of DMF-solvated Fe-BTTri, according to an embodiment of the present disclosure.
Figure 6B:
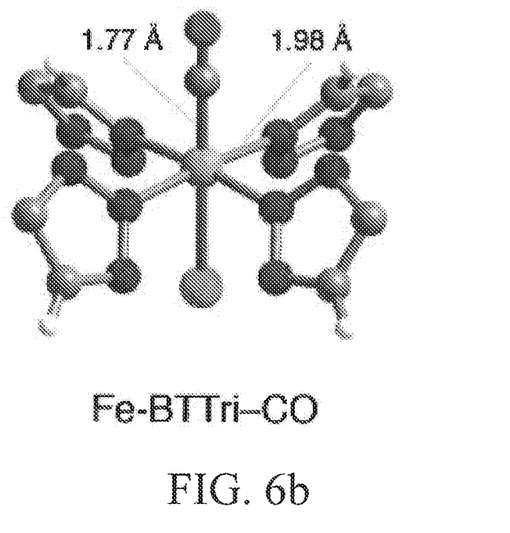
FIG. 6b depicts CO-dosed Fe-BTTri, according to an embodiment of the present disclosure.
Figure 6C:
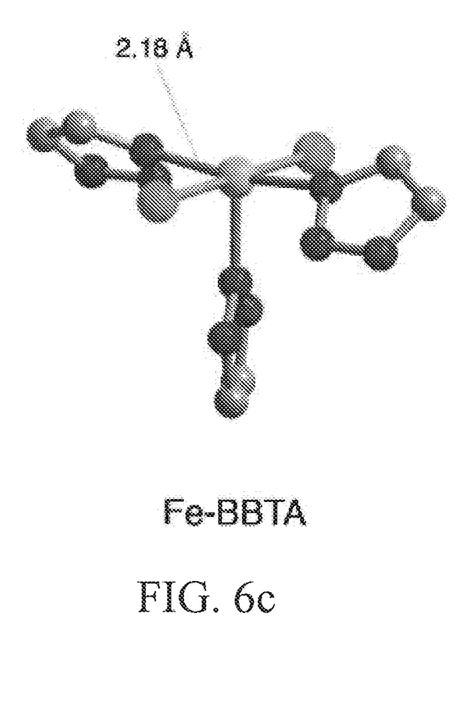
FIG. 6c depicts activated Fe-BBTA, according to an embodiment of the present disclosure.
Figure 6D:
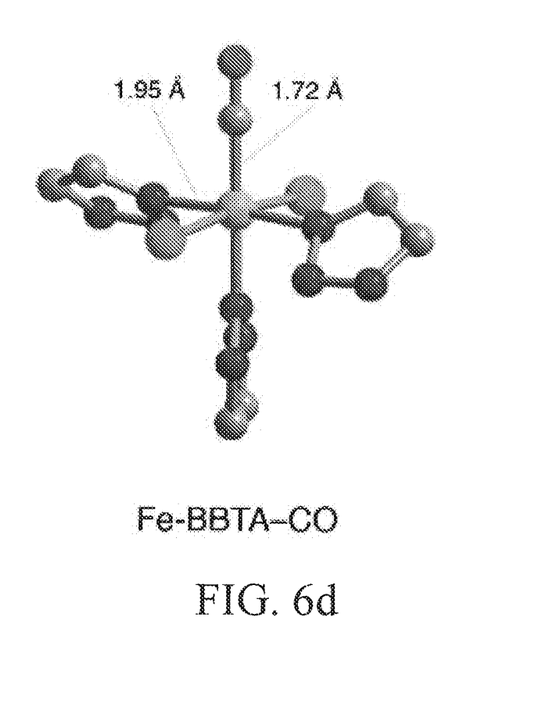
FIG. 6d depicts CO-dosed Fe-BBTA, according to an embodiment of the present disclosure.

FIG. 6a depicts portions of the structures of DMF-solvated Fe-BTTri, according to an embodiment of the present disclosure. FIG. 6b depicts CO-dosed Fe-BTTri, according to an embodiment of the present disclosure. FIG. 6c depicts activated Fe-BBTA, according to an embodiment of the present disclosure. FIG. 6d depicts CO-dosed Fe-BBTA, according to an embodiment of the present disclosure. In an embodiment, the structures shown in FIGS. 6a-6d are determined by analysis of single crystal or powder X-ray diffraction data. Orange, grey, blue, red, green, and white represent Fe, C, N, O, Cl, and H, respectively.

In an embodiment, direct probing of the metal site were also accomplished with Mossbauer spectroscopy and DC magnetic susceptibility, which are both consistent with conversion between high-spin $Fe^{2+}$ in the bare frameworks and low-spin upon binding CO. In Fe-BTTri, the Mössbauer spectra of the bare framework show typical parameters of high-spin $Fe^{2+}$, with an average δ of 1.01 mm/s and $\Delta E_Q$ of 2.53 mm/s. Upon dosing with CO, a new doublet with δ=0.28 mm/s and $\Delta E_Q$=1.22 mm/s appears, fully consistent with low-spin $Fe^{2+}$. Fe-BBTA shows similar transitions between the bare and CO-loaded samples. The bare framework exhibits iron sites with the parameters δ=1.09 mm/s and $\Delta E_Q$=1.96 mm/s, while upon CO-loading the parameters change to δ=0.39 mm/s and $\Delta E_Q$=0.99 mm/s. This is again consistent with conversion of high-spin in the bare framework to a low-spin $Fe^{2+}$—CO species. The DC magnetic susceptibility at room temperature is another good probe of this spin state change, as the value should decrease with increasing CO loading due to the high-spin to low-spin transition representing a switch between spin state S=2 and spin state S=0. For Fe-BTTri, the bare framework displays a room temperature moment of 82.9 emu·K/mol, consistent with the calculated 81 emu·K/mol for all high-spin $Fe^{2+}$ sites. Upon loading with 13.4% and 44.3% CO, the moment decreases to 71.4 and 50.8 emu·K/mol, respectively, close to the expected values upon conversion of the $Fe^{2+}$—CO converting to S=0.

Furthermore, in an embodiment, structural data from single crystal X-ray diffraction and powder X-ray diffraction can also be used to see the identity of the iron sites, as low-spin centers will have shorter bond lengths (see, FIGS. 6a-6d). For Fe-BTTri, the bare framework shows Fe—N bond lengths of 2.14 Å, while Fe-BBTA shows Fe—N lengths of 2.18 Å. These values are indicative of high-spin $Fe^{2+}$, and match several reported values of $Fe^{2+}$ metal-organic frameworks. Upon loading with CO, these bond lengths shorten drastically, with new Fe—N lengths of 1.98 and 1.95 Å for Fe-BTTri and Fe-BBTA, respectively. The Fe—$C_{CO}$ bond length becomes also shorter which is indicative of a low-spin center. Indeed, Fe-BTTri displays a Fe—$C_{CO}$ distance of 1.76 Å, with Fe-BBTA showing 1.72 Å. The combination of all of these characterization techniques can be used to confirm the spin state change mechanism in all of these frameworks, leading to the interesting gas adsorption properties described above.

Therefore, as it can be appreciated from the above paragraphs, Fe-BBTri, Fe-BBTA, and Fe-BTDD all are capable of a unique spin change mechanism at the $Fe^{2+}$ sites of the framework that allow for very efficient separations involving CO. Highly selective separations featuring low regeneration energies and high working capacities with stepped-shape adsorption isotherms are reported for the first time, as well as new materials that are able to remove trace amounts of CO from CO/$H_2$ mixtures. While the above examples focused exclusively on CO separations, this concept can easily be applied to other gas separations involving π acids, such as $N_2$ in $N_2$/$CH_4$ separations, $O_2$ in $O_2$/$N_2$ separations, and olefins in olefin/paraffin separations, which are industrially relevant processes that occur on large scales. This new class of materials features a new mechanism for gas separations unseen in adsorbants, and represents an exciting new direction towards development of effective adsorbants for gas separations.

According to some embodiments of the current disclosure, three new metal-organic frameworks, Fe-BTTri, Fe-BBTA, and Fe-BTDD, are able to reversibly convert between coordinately unsaturated, high-spin transition metal sites in the activated framework to low-spin sites by binding gas molecules. This spin transition is observed for only certain gas molecules, forming a basis for very selective separations. This mechanism is extremely effective for selective CO adsorption in mixtures with $H_2$, $N_2$, $CO_2$, $CH_4$, $C_2H_6$, and $C_2H_4$ in a variety of different conditions. Upon desorption of the bound gas substrates, the framework sites convert back to high-spin, allowing for the facile regeneration and recyclability of the materials. While adsorbate-induced spin transitions may be available in molecular chemistry, this is the first example of this occurring in a porous material, and it allows for the development of highly selective, recyclable adsorbants. A porous material comprising Fe-BTTri, Fe-BBTA, and/or Fe-BTDD allows for a flow of fluid mixture containing CO to pass therethrough which provides for a selective capture of CO by the metal organic framework Fe-BTTri, Fe-BBTA, and/or Fe-BTDD and thus selective separation of CO from the fluid mixture.

This spin state change mechanism in this unique class of material has been studied for effective CO separations in gas mixtures in two distinct ways. Fe-BTTri is shown to adsorb significant quantities of CO in low-concentration situations at temperatures near room temperature, making it, for example, ideal for the production of extremely pure $H_2$ that can then be used for ammonia synthesis or in fuel cells, as the catalysts for these systems are very sensitive to even trace amounts of CO. Fe-BBTA and Fe-BTDD both show a 'stepped' shape (Type V) isotherm in the adsorption isotherm of CO, which would be useful as an adsorbant with a high working capacity and low regeneration energies for use of CO as a synthetic precursor for a variety of valuable products, including monomers, polymers, alcohols, and acetic acid. Typically, feeds involving CO, such as coal gas or as byproducts from iron and steel production, contain several other contaminants such as $N_2$, $H_2$, and $CO_2$, among others, requiring efficient separations to make CO cost effective. This same ability can be used adjusting ratios of CO and $H_2$ in syngas to use as a gas mixture for a wide range of industrial applications. All of these applications currently use energetically costly cryogenic technology to remove or separate CO. These same properties have also been shown for selective CO separations in mixtures $H_2$, $N_2$, $CO_2$, $CH_4$, $C_2H_6$, and $C_2H_4$, showing its broad utility. The unique spin change mechanism can also be used in other gas separations that would benefit from selective spin changes, such as $N_2$ in $N_2/CH_4$ separations, $O_2$ in $O_2/N_2$ separations, and olefins in olefin/paraffin separations.

Although, in the above paragraphs, the metal-organic frameworks, Fe-BTTri, Fe-BBTA, and Fe-BTDD are shown to be used separately. As it can be appreciated, it is also contemplated that one or more of Fe-BTTri, Fe-BBTA, and Fe-BTDD materials be used together to achieve a desired effect on CO separation. For example, a mixture of Fe-BTTri and Fe-BBTA or a mixture of Fe-BTTri and Fe-BTDD or mixture of all three materials can be used to achieve certain characteristics of CO adsorption and/or desorption depending on desired industrial application. The general concepts of the current invention are not limited to the examples described above. For example, additional embodiments can include some or all of the following:

1. Upon adsorption of a gas molecule, there is an observable electronic transition, including but not limited to a spin transition, at the metal node or metal site of a framework. This transition is selective for one gas molecule in a particular mixture, allowing for very selective separations. This electronic transition is also reversible, so that the material can be regenerated.
2. This electronic transition can be done with any transition metal, including but not limited to vanadium, chromium, manganese, iron, cobalt, nickel, and copper.
3. This type of electronic transition-based separation can be envisioned for several types of gas separations, including $CO/H_2$, $CO/N_2$, $CO/CO_2$, $CO/C_2H_4$, $CO/C_2H_6$, $CO/CH_4$, olefin/paraffin separations (including ethylene/ethane, propylene/propane), $O_2/N_2$, and $N_2/CH_4$ separations. In all cases, this specific transition can happen for the first molecule listed, and not the second, allowing for very selective separations.

To generalize the more specific systems currently described, the following may be made to classify several different types of materials that would be able to undergo the spin transitions at an Fe(II) site:

1. Any metal-organic framework that contains triazole and/or triazolate-based bridging ligands that coordinate to Fe(II) in such a way that upon activation of the framework, an open coordination site exists on an Fe(II) site ligated, not necessarily exclusively, by triazoles and/or triazolates. The materials described are an example of this type of framework.
2. This open Fe(II) site may be accessible after synthesis of the overall framework, that is this type of Fe(II) site may be created after vacant triazole and/or triazolate site(s) that may be left uncoordinated after synthesis of a parent compound is then occupied later by Fe(II) in such a way that is coordinated to these triazole and/or triazolate site(s) and contains an open coordination site.
3. This particular type of Fe(II) site can coexist with any other type of metal site or metal node. The present disclosure encompasses any material that includes an Fe(II) site that displays these adsorbate-dependent spin transition properties which are the basis for molecule separation.
4. The spin transition can be envisioned for a variety of different gas separations (listed above) and thus is not limited to just carbon monoxide (CO) separations but can be used on any other molecule as described in the above paragraphs.
5. Platforms or chemical formulas shown below which are based on the general scheme described in the above paragraphs could all reasonably make the materials similar to those already included (all position designated as R could be replaced by functional groups including but not limited to hydrogen, alkyl, substituted alkyl, alkenyl, substituted alkenyl, alkynyl, substituted alkynyl, aryl, substituted aryl, heterocycle, substituted heterocycle, halide, amine, amide, imino, cyano, isocyano, hydroxide, ether, ketone, ester, carboxylate, phosphine, phosphate, thioester, thioether, sulfate, and sulfide groups):

As it must be appreciated from the above paragraphs, there is provided an adsorbate-selective metal organic framework. The adsorbate-selective organic framework includes a transition metal. In an embodiment, the transition metal is iron (Fe). In an embodiment, the transition metal can also be selected from the group of transition metals consisting of vanadium, chromium, manganese, iron, cobalt, nickel, and copper.

The adsorbate-selective organic framework also includes a plurality of organic molecules coordinated to the transition metal (for example Fe) so as to preserve open coordination sites for selectively adsorbing gas molecules that have low-lying π* orbitals. In an embodiment, the plurality of organic molecules are selected from the group of organic molecules given by the above chemical formulas, wherein R is selected from hydrogen, alkyl, substituted alkyl, alkenyl, substituted alkenyl, alkynyl, substituted alkynyl, aryl, substituted aryl, heterocycle, substituted heterocycle, halide, amine, amide, imino, cyano, isocyano, hydroxide, ether, ketone, ester, carboxylate, phosphine, phosphate, thioester, thioether, sulfate, and sulfide groups. In another embodiment, the plurality of organic molecules are one of $H_3BTTri$, $H_2BBTA$, or $H_2BTDD$, or any combination thereof.

In an embodiment, the transition metal (for example Fe) has a lowest energy spin state in the presence of the selectively adsorbed gas molecules (for example CO) that are strongly bonding to the transition metal through π-donating interactions. The transition metal (for example Fe) has the lowest energy spin state in the presence of non-selected molecules (for example $H_2$) that are weakly bonding to the transition metal (for example Fe) through σ- and/or π-donating interactions.

In an embodiment, the selectively adsorbed gas molecules can be at least one of CO, an olefin, $O_2$, or $N_2$ gas molecules. In an embodiment, the non-selected gas molecules can be at least one of $H_2$, $N_2$, $CO_2$, $CH_4$, $C_2H_4$, $C_2H_6$, or a paraffin. For example, as described in the above paragraphs, the selectively adsorbed molecules can be CO while the non-selected molecules can be $H_2$, $N_2$, $CO_2$, $C_2H_4$, $C_2H_6$ or $CH_4$.

As described in the above paragraphs, the transition metal (for example Fe) is switchable to a higher energy spin state by controlling a temperature or a pressure, or both in the adsorbate selective metal organic framework to enable desorption of the selectively adsorbed molecules (for example CO). The process of adsorption and desorption can be repeated a plurality of times. Indeed, the transition metal can transform reversibly from a lower spin state to a higher spin state and vice versa, the lower spin state of the transition metal enabling a strong interaction between the selectively adsorbed molecules and the transition metal, and the higher spin state of the transition metal enabling release or desorption of the selectively adsorbed molecules. For example, the transition metal is switchable to a higher energy spin state by increasing the temperature or lowering the pressure, or both in the adsorbate selective metal organic framework to enable desorption of the selectively adsorbed gas molecules (for example CO). In an embodiment, the adsorbate-selective metal organic framework is porous so as to allow a fluid containing the selectively adsorbed molecules (for example CO) and the non-selected molecules (for example $H_2$) to pass therethrough and interact with the transition metal (for example Fe).

As it must be appreciated from the above paragraphs, there is also provided a method of separating a selected type (component) of gas molecules from a mixture of types (components) of gas molecules. The method includes exposing a porous material to the mixture of types (components) of gas molecules. The method also includes separating the selected type (component) of gas molecules from the mixture of types (components) of gas molecules after being exposed to the porous material. The selected type (component) of gas molecules that are separated from the mixture of types (components) of gas molecules are adsorbed preferentially by the porous material during the exposing compared to adsorption of other types (components) of gas molecules in the mixture of types (components) of gas molecules. The method further includes changing an environment (for example changing temperature, pressure or both of the gas) of the porous material after the exposing and separating so as to cause the selected type (component) of adsorbed gas molecules to outgas from the porous material. In an embodiment, the porous material comprises an adsorbate-selective metal organic framework described in the above paragraphs.

The embodiments illustrated and discussed in this specification are intended only to teach those skilled in the art how to make and use the invention. In describing embodiments of the disclosure, specific terminology is employed for the sake of clarity. However, the disclosure is not intended to be limited to the specific terminology so selected. The above-described embodiments of the disclosure may be modified or varied, without departing from the invention, as appreciated by those skilled in the art in light of the above teachings. It is therefore to be understood that, within the scope of the claims and their equivalents, the invention may be practiced otherwise than as specifically described. For example, it is to be understood that the present disclosure contemplates that, to the extent possible, one or more features of any embodiment can be combined with one or more features of any other embodiment.

REFERENCES

[1] (a) Yaghi, O. M.; Li, H.; Eddaoudi, M.; O'Keefe, M. Nature 1999, 402, 276-279. (b) Kitagawa, S.; Kitaura, R.; Noro, S.-I. Angew. Chem., Int. Ed. 2004, 43, 2334-2375. (c) Matsuda, R.; Kitaura, R.; Kitagawa, S.; Kubota, Y.; Belosludov, R. V.; Kobayashi, T. C.; Sakamoto, H.; Chiba, T.; Takata, M.; Kawazoe, Y.; Mita, Y. Nature 2005, 436, 238-241. (d) Millward, A. R.; Yaghi, O. M. J. Am. Chem. Soc. 2005, 127, 17998-17999. (e) Ferey, G. Chem. Soc. Rev. 2008, 37, 191-214. (f) Morris, R. E.; Wheatley, P. S. Angew. Chem., Int. Ed. 2008, 47, 4966-4981. (g) Czaja, A. U.; Trukhan, N.; Müller, U. Chem. Soc. Rev. 2009, 38, 1284-1293. (h) Chen, B.; Xiang, S.; Qian, G. Acc. Chem. Res. 2010, 43, 1115-1124. (i) Zhou, H.-C.; Long, J. R.; Yaghi, O. M. Chem. Rev. 2012, 112, 673-674. (j) Sumida, K.; Rogow, D. R.; Mason, J. A.; McDonald, T. M.; Bloch, E. D.; Herm, Z. R.; Bae, T.-H.; Long, J. R. Chem. Rev. 2012, 112, 724-781. (k) Li, J.-R.; Sculley, J.; Zhou, H.-C. Chem. Rev. 2012, 112, 869-932.

[2] (a) Caskey, S. R.; Wong-Foy, A. G.; Matzger, A. J. J. Am. Chem. Soc. 2008, 130, 10870-10871. (b) Dincă, M.; Long, J. R. *Angew. Chem., Int. Ed.* 2008, 47, 6766-6779. (c) Dietzel, P. D. C.; Besikiotis, V.; Blom, R. *J. Mater. Chem.* 2009, 19, 7362-7370. (d) Herm, Z. R.; Swisher, J. A.; Smit, B.; Krishna, R.; Long, J. R. *J. Am. Chem. Soc.* 2011, 133, 5664-5667. (e) Mason, J. A.; Sumida, K.; Herm, Z. R.; Krishna, R.; Long, J. R. *Energy Environ. Sci.* 2011, 4, 3030-3040. (f) Bloch, E. D.; Murray, L. M.; Queen, W. L.; Chavan, S.; Maximoff, S. N.; Bigi, J. P.; Krishna, R.; Peterson, V. K.; Grandjean, F.; Long, G. J.; Smit, B.; Bordiga, S.; Brown, C. M.;
Long, J. R. *J Am. Chem. Soc.* 2011, 133, 14814-14822. (g) Peng, Y.; Krungleviciute, V.; Eryazici, I.; Hupp, J. T.; Farha, O. K.; Yildirim, T. *J Am. Chem. Soc.* 2013, 135, 11887-11894.
(h) Herm, Z. R.; Krishna, R.; Long, J. R. *Microporous Mesoporous. Mater.* 2012, 151, 481-487. (i) Mason, J. A.; Veenstra, M.; Long, J. R. *Chem. Sci.* 2014, 5, 32-51. (j) Herm, Z. R.; Bloch, E. D.; Long, J. R. *Chem. Mater.* 2014, 26, 323-338.

[3] Lee, K.; Isley, W. C., III; Dzubak, A. L.; Verma, P.; Stoneburner, S. J.; Lin, L.-C.; Howe, J. D.; Bloch, E. D.; Reed, D. A.; Hudson, M. R.; Brown, C. M.; Long, J. R.; Neaton, J. B.; Smit, B.; Cramer, C. J.; Truhlar, D. G.; Gagliardi, L. *J. Am. Chem. Soc.* 2014, 136, 698-704.

[4] (a) Colombo, V.; Galli, S.; Choi, H. J.; Han, G. D.; Maspero, A.; Palmisano, G.; Masciocchi, N.; Long, J. R. *Chem. Sci.* 2011, 2, 1311-1319. (b) Anderson, J. S.; Gallagher, A. T.; Mason, J. A.; Harris, T. D. *J Am. Chem. Soc.* 2014, 136, 16489-16492.

[5] (a) Baschuk, J. J.; Li, X. *Int. J Energy Res.* 2001, 25, 696-713. (b) Li, Q.; He, R.; Gao, J. A.; Jensen, J. O.; Bjerrum, N. J. *J. Electrochem. Soc.* 2003, 150, A1599-A1605.

[6] Kerry, F. G. *Industrial Gas Handbook: Gas Separation and Purification*; CRC: Boca Raton, Fla., 2007.

[7] International Energy Agency. *Global Action to Advance Carbon Capture and Storage: A Focus on Industrial Applications;* 2013.

[8] (a) Keizer, K.; Zaspalis, V. T.; De Lange, R. S. A.; Harold, M. P.; Burggraaf, A. J. *Membrane Processes in Separation and Purification*; Crespo, J. G., Boddeker, K. W., eds.; Kluwer Academic Publishers: Dordrecht, Germany, 1994.

[9] (a) Dutta, N. N.; Patil, G. S. *Gas. Sep. Purif.* 1995, 9, 277-283. (b) McCandless, F. P. *Ind. Eng. Chem. Process Des. Dev.* 1972, 11, 470-478.

[10] (a) Tamon, H.; Kitamura, K.; Okazaki, M. *AIChE J.* 1996, 42, 422. (b) Golden, T. C.; Guro, D. E.; Kratz, W. C.; Sabram, T. E. *Fundamentals of Adsorption*; Meunier, F., Ed.; Elsevier: Amsterdam, The Netherlands, 1998. (c) Miyajima, H.; Kodama, A.; Goto, M.; Hirose, T. *Adsorption* 2005, 11, 625-630.

[11] (a) Kohl, A. L.; Reisenfeld, F. C. *Gas Purification,* 3rd ed.; Gulf Publishing: Houston, Tex., 1979. (b) Haase, D. J.; Walker, D. G. *Chem Eng. Prog.* 1974, 70, 74.

[12] (a) Sato, H.; Kosaka, W.; Matsuda, R.; Hori, A.; Hijikata, Y.; Belosludov, R. V.; Sakaki, S.; Takata, M.; Kitagawa, S. *Science* 2014, 343, 167-170. (b) Bloch, E. D.; Hudson, M. R.; Mason, J. A.; Chavan, S.; Crocella, V.; Howe, J. D.; Lee, K.; Dzubak, A. L.; Queen, W. L.; Zadrozny, J. M.; Geier, S. J.; Lin, L.-C.; Gagliardi, L.; Smit, B.; Neaton, J. B.; Bordiga, S.; Brown, C. M.; Long, J. R. *J Am. Chem. Soc.* 2014, 136, 10752-10761.

[13] (a) Denysenko, D.; Grzywa, M.; Jelic, J.; Reuter, K.; Volkmer, D. *Angew. Chem., Int. Ed.* 2014, 53, 5832-5836. (b) Gonzalez, M. I.; Bloch, E. D.; Mason, J. A.; Teat, S. J.; Long, J. R. *Inorg. Chem.* 2015, 54, 2995-3005. [14] (a) Halder, G. J.; Kepert, C. J.; Moubaraki, B.; Murray, K. S.; Cashion, J. D. *Science* 2002, 298, 1762-1765. (b) Niel, V.; Martinez-Agudo, J. M.; Munoz, M. C.; Gaspar, A. B.; Real, J. A. *Inorg. Chem.* 2001, 40, 3838-3839. (c) Neville, S. M.; Halder, G. J.; Chapman, K. W.; Duriska, M. B.; Southon, P. D.; Cashion, J. D.; Letard, J. F.; Moubaraki, B.; Murray, K. S.; Kepert, C. J. *J. Am. Chem. Soc.* 2008, 130, 2869-2876. (d) Ohba, M.; Yoneda, K.; Agusti, G.; Munoz, M. C.; Gaspar, A. B.; Real, J. A.; Yamasaki, M.; Ando, H.; Nakao, Y.; Sakaki, S; Kitagawa, S. *Angew Chem., Int. Ed.* 2009, 48, 4767-4771. (e) Southon, P. D.; Liu, L.; Fellows, E. A.; Price, D. J.; Halder, G. J.; Chapman, K. W.; Moubaraki, B.; Murray, K. S.; Letard, J. F.; Kepert, C. J. *J. Am. Chem. Soc.* 2009, 131, 10998-11009. (f) Salles, F.; Maurin, G.; Serre, C.; Llewellyn, P. L.; Knofel, C.; Choi, H. J.; Filinichuk, Y.; Oliviero, L.; Vimont, A.; Long, J. R.; Ferey, G. *J. Am. Chem. Soc.* 2010, 132, 13782-13788. (g) Chuang, Y. C.; Liu, C. T.; Sheu, C. F.; Ho, W. L.; Lee, G. H.; Wang, C. C.; Wang, Y. *Inorg. Chem.* 2012, 51, 4663-4671.

[15] (a) Garcia, Y.; Niel, V.; Munoz, M. C.; Real, J. A. *Top. Curr. Chem.* 2004, 233, 229-257. (b) Van Koningsbruggen, P. J. *Top. Curr. Chem.* 2004, 233, 123-149.

[16] Demessence, A.; D'Alessandro, D. M.; Foo, M. L.; Long, J. R. *J. Am. Chem. Soc.* 2009, 131, 8784-8786.

[17] Liao, P. Q.; Li, X. Y.; Bai, J.; He, C. T.; Zhou, D. D.; Zhang, W. Z.; Zhang, J. P.; Chen, X. M. *Chem. Eur. J.* 2014, 20, 11303-11307.

[18] McDonald, T. M.; Mason, J. A.; Kong, X.; Bloch, E. D.; Gygi, D.; Dani, A.; Crocella, V.; Giordanino, F.; Odoh, S. O.; Drisdell, W.; Vlaisavljevich, B.; Dzubak, A. L.; Poloni, R.; Schnell, S. K.; Planas, N.; Lee, K.; Pascal, T.; Wan, L. F.; Prendergast, D.; Neaton, J. B.; Smit, B.; Kortright, J. B.; Gagliardi, L.; Bordiga, S.; Reimer, J. A.; Long, J. R. *Nature* 2015, 519, 303-308.

We claim:

1. An adsorbate-selective metal organic framework, comprising:
   a transition metal of comprising iron (Fe); and
   a plurality of organic molecules coordinated to said transition metal to form a Fe-organic molecule framework so as to preserve open coordination sites for molecules to be selectively adsorbed to provide selectively adsorbed molecules,
   wherein said selectively adsorbed molecules have $\pi^*$ orbitals adapted to accept electron density from said transition metal,
   wherein said transition metal is in a high-spin electron configuration in the absence of the selectively adsorbed molecules, said high-spin electron configuration defining a high-spin configuration of the transition metal,
   wherein said transition metal converts to a low-spin electron configuration defining a low-spin configuration of the transition metal in the presence of said selectively adsorbed molecules that are bonding to said transition metal by donating electron density to the $\pi^*$ orbitals of the selectively adsorbed molecule, such that upon exposure to the selectively adsorbed molecules said transition metal undergoes a spin state transition, and
   wherein said transition metal remains high-spin electron configuration in the presence of non-selected molecules that are non-bonding to said transition metal.

2. The adsorbate-selective metal organic framework according to claim 1, wherein said transition metal is switchable to the high-spin electron configuration by controlling a temperature or a pressure, or both in said adsorbate-selective metal organic framework to enable desorption of said selectively adsorbed molecules.

3. The adsorbate-selective metal organic framework according to claim 2, wherein said transition metal is switchable to the high-spin electron configuration by increasing the temperature or lowering the pressure, or both in said adsorbate-selective metal organic framework to enable desorption of said selectively adsorbed molecules.

4. The adsorbate-selective metal organic framework according to any one of claims 1-3, wherein said plurality of organic molecules are selected from the group of organic molecules given by the following formulas:

wherein R is selected from hydrogen, alkyl, substituted alkyl, alkenyl, substituted alkenyl, alkynyl, substituted alkynyl, aryl, substituted aryl, heterocycle, substituted heterocycle, halide, amine, amide, imino, cyano, isocyano, hydroxide, ether, ketone, ester, carboxylate, phosphine, phosphate, thioester, thioether, sulfate, and sulfide groups.

5. The adsorbate-selective metal organic framework according to claim 1, wherein said plurality of organic molecules are one of $H_3BTTri$, $H_2BBTA$, or $H_2BTDD$, or any combination thereof.

6. The adsorbate-selective metal organic framework according to claim 1, wherein said selectively adsorbed molecules are at least one of CO, an olefin, $O_2$, or $N_2$ molecules.

7. The adsorbate-selective metal organic framework according to claim 6, wherein said non-selected molecules are at least one of $H_2$, $N_2$, $CO_2$, $CH_4$, $C_2H_4$, $C_2H_6$, or a paraffin.

8. The adsorbate-selective metal organic framework according to claim 1, wherein said adsorbate-selective metal organic framework is porous so as to allow a fluid containing the selectively adsorbed molecules and the non-selected molecules to pass therethrough and interact with the transition metal,
wherein concentration of selectively adsorbed molecules in said fluid is reduced as these molecules are adsorbed onto the metal organic framework to induce the spin state transition at the transition metal, and
wherein the selectively adsorbed molecules are released by stopping a flow of the fluid and then controlling temperature or pressure parameters.

9. A method of separating a selected component of gas molecules from a mixture of components of gas molecules using a metal organic framework, the method comprising:
exposing a porous material to said mixture of components of gas molecules, the porous material having the metal organic framework comprising:
a transition metal of iron (Fe); and
a plurality of organic molecules coordinated to said transition metal to form a Fe-organic molecule framework so as to preserve open coordination sites for molecules to be selectively adsorbed to provide selectively adsorbed molecules,
wherein said selectively adsorbed molecules have $\pi^*$ orbitals adapted to accept electron density from said transition metal,
wherein said transition metal is in a high-spin electron configuration in the absence of the selectively adsorbed molecules, said high-spin electron configuration defining a high-spin configuration of the transition metal,
wherein said transition metal converts to a low-spin electron configuration defining a low-spin configuration of the transition metal in the presence of said selectively adsorbed molecules that are bonding to said transition metal by donating electron density to the $\pi^*$ orbitals of the selectively adsorbed molecule, such that upon exposure to the selectively adsorbed molecules said transition metal undergoes a spin state transition, and
wherein said transition metal remains high-spin electron configuration in the presence of non-selected molecules that are non-bonding to said transition metal; and
separating said selected component of gas molecules including the selectively adsorbed molecules from said mixture of components of gas molecules after being exposed to said porous material,
wherein said selected component of gas molecules being separated from said mixture of components of gas molecules are adsorbed preferentially by said porous material during said exposing compared to adsorption of other components of gas molecules including the non-selected molecules in said mixture of components of gas molecules.

10. The method of claim 9, further comprising changing an environment of said porous material having the metal organic framework after said exposing and separating so as to cause the selected component of adsorbed gas molecules to outgas from said porous material.

11. The method of claim 10, wherein said changing said environment of said porous material having the metal organic framework comprises at least one of changing a temperature or a surrounding gas pressure.

* * * * *